United States Patent [19]

Fabre et al.

[11] Patent Number: 5,186,416
[45] Date of Patent: Feb. 16, 1993

[54] SYSTEM FOR REDUCING THE FORCES APPLIED TO THE WINGS AND PARTICULARLY TO THE ROOT OF THE WINGS OF AN AIRCRAFT IN FLIGHT

[75] Inventors: Pierre Fabre; Xavier Le Tron; Philippe Lacoste, all of Toulouse, France

[73] Assignee: Societe Anonyme dite: Aerospatiale Societe Nationale Industrielle, Paris, France

[21] Appl. No.: 634,695

[22] Filed: Dec. 27, 1990

[30] Foreign Application Priority Data

Dec. 28, 1989 [FR] France ................ 89 17341

[51] Int. Cl.$^5$ ............................... B64C 13/16
[52] U.S. Cl. ................ 244/75 R; 244/76 C; 244/191
[58] Field of Search ............... 244/75 R, 75 A, 76 C, 244/76 R, 191, 181, 175; 364/433, 434; 340/968

[56] References Cited

U.S. PATENT DOCUMENTS

| | | | |
|---|---|---|---|
| 2,985,409 | 5/1961 | Atwood et al. | 244/76 C |
| 3,347,498 | 10/1967 | Priestley et al. | 244/191 |
| 4,479,620 | 10/1984 | Rogers et al. | 244/75 R |
| 4,562,546 | 12/1985 | Wykes et al. | |
| 4,651,955 | 3/1987 | Krafka | 244/75 R X |
| 4,725,020 | 2/1988 | Whitener | |
| 4,787,042 | 11/1988 | Burns et al. | |
| 4,796,192 | 1/1989 | Lewis | |
| 4,821,981 | 4/1989 | Gangsaas et al. | |
| 4,821,982 | 4/1989 | VanPatten | |
| 4,855,738 | 8/1989 | Greene | 244/181 X |
| 4,905,934 | 3/1990 | Chin | 244/76 C |

FOREIGN PATENT DOCUMENTS

| | | | |
|---|---|---|---|
| 0213760 | 3/1987 | European Pat. Off. | |
| 2559123 | 8/1985 | France | 244/76 C |
| WO8702964 | 5/1987 | PCT Int'l Appl. | |

OTHER PUBLICATIONS

*Journal of Aircraft*, vol. 26, No. 4, Apr. 26, 1989, New York, pp. 322-327.

Primary Examiner—Margaret A. Focarino
Assistant Examiner—C. Mattix
Attorney, Agent, or Firm—Marshall, O'Toole, Gerstein, Murray & Bicknell

[57] ABSTRACT

A system for reducing the forces applied to the wings of an aircraft in flight includes an accelerometer for measuring the vertical acceleration of the aircraft and generators for generating signals to control the aerodynamic surfaces in the wings of the aircraft as a function of the acceleration measured by the accelerometer. The control signal generator is not activated except when the vertical acceleration exceeds a predetermined value.

19 Claims, 3 Drawing Sheets

SYSTEM FOR REDUCING THE FORCES APPLIED TO THE WINGS AND PARTICULARLY TO THE ROOT OF THE WINGS OF AN AIRCRAFT IN FLIGHT

BACKGROUND OF THE INVENTION

1. Field of the Invention

The present invention relates to a system for reducing the forces applied to the wings and particularly to the root of the wings of an aircraft in flight.

When an aircraft makes a maneuver, such as a pull-up, or when it is subjected to a gust of wind, that maneuver causes an increase of the lift and so of the forces applied to the wings and particularly to the root of the wings. A maneuver such as a pull-up or a gust of wind results in a vertical acceleration of the aircraft which can be measured by means of accelerometers. The measurement of such acceleration is called "vertical load factor". For a given load factor, the forces applied to the wings and particularly to the root of the wings can only be reduced by bringing the point of application of the lift close to the root of the wings through an upward deflection of the ailerons provided in the vicinity of the free end of each wing.

2. Description of the Prior Art

From the document U.S. Pat. No. 3,347,498 a system is already known for reducing the forces applied to the root of the wings of an aircraft, not only when this latter is effecting maneuvers but also when it is subjected to gusts of wind, comprising accelerometers disposed on the fuselage and at the ends of the wings of the aircraft, and control means for controlling the deflection angle of the ailerons, provided in the vicinity of the free ends of the wings, proportionally to the vertical acceleration of the aircraft measured by said accelerometers.

Such a system is activated whatever the vertical acceleration to which the aircraft is subjected, and that proportionally to said acceleration. The smallest accelerations are therefore reflected in the deflection angle of the ailerons, which may cause disturbances of the flight conditions and causes repeated and often superfluous operation of the actuating jacks of the ailerons.

SUMMARY OF THE INVENTION

The purpose of the present invention is to overcome these drawbacks.

For this, the system for reducing the forces applied to the wings and particularly to the root of the wings of an aircraft in flight, of the type comprising means for detecting and measuring the vertical acceleration of the aircraft, and means for supplying signals for controlling the aerodynamic surfaces connected to the wings of the aircraft, said control means controlling the deflection angle of said aerodynamic surfaces as a function of the acceleration signals which they receive, is remarkable according to the invention in that said control means are only activated when said vertical acceleration $\gamma$ exceeds a predetermined threshold $\gamma s$.

Thus, a non zero control signal for deflection of said aerodynamic surfaces is effectively applied to said surfaces only when the vertical acceleration $\gamma$ exceeds a predetermined threshold. In other words, the system of the invention is effectively only brought into service when the forces on the wings and particularly on the root of the wings of the aircraft are likely to reach a critical value, placing the integrity of the structure of the wings in danger, whether the aircraft is effecting a maneuver or whether it is being subjected to a gust of wind, low accelerations without danger for the same structure not being taken into account.

Preferably, above said threshold $\gamma s$, said signals for controlling the deflection angle of said aerodynamic surfaces are proportional to $\gamma - \gamma s$.

In the case where the system of the invention is more particularly adapted for reducing the forces applied to the wings and particularly to the root of the wings of the aircraft when the latter is effecting a maneuver such as a pull-up and when said aircraft is a heavy transport civil aircraft, said acceleration threshold $\gamma s$ is substantially equal to 2 g.

Advantageously, the control signal varies linearly between 0 and 1 when the acceleration $\gamma$ varies between said threshold $\gamma s$ and the maximum admissible acceleration $\gamma max$. In particular, the maximum admissible acceleration $\gamma max$ is substantially equal to 2.5 g.

According to another characteristic of the present invention, said control signals are used also for controlling the pitch control surfaces of the aircraft to counter the pitching moment created by deflection of said aerodynamic surfaces.

According to yet another characteristic of the present invention, the deflection angle of said aerodynamic surfaces and, if required, of the pitch control surfaces is obtained by multiplying the control signal by a constant factor which depends on the nature of said surfaces.

According to another characteristic of the present invention, the present control signal is immediately applied to the aerodynamic surfaces when, above said threshold $\gamma s$, the vertical acceleration $\gamma$ increases.

Preferably, when the vertical acceleration $\gamma$ decreases while remaining above said threshold $\gamma s$, the present control signal is effectively applied to the aerodynamic surfaces only when the difference between the signal previously in force applied to the aerodynamic surfaces and the present signal reaches a predetermined threshold. In particular, with the control signal varying between 0 and 1, said difference threshold is substantially equal to 0.2.

Furthermore, the present control signal is immediately applied to the aerodynamic surfaces when said control signal is, in absolute value, less than a predetermined value. More particularly, with the control signal varying between 0 and 1, said value is substantially equal to 0.1.

According to another characteristic of the present invention, said control means comprise means for computing the control signal properly speaking and means for translating this signal into a deflection angle of said aerodynamic surfaces.

Advantageously, said means for computing the control signal comprise a linear interpolation table connected to said means for detecting and measuring the vertical acceleration of the aircraft.

Furthermore, said computing means comprise a first AND logic gate, to the three inputs of which the following information is delivered:
  the aircraft is in flight or not,
  the aircraft is in a smooth configuration or not, and
  the control stick is deflected above a predetermined angular threshold or not,
and whose output controls a first switch, whose two inputs are connected respectively to a zero value reference generator and to the output of said linear interpolation table.

According to another characteristic of the present invention, said computing means comprise a first comparator for comparing the present control signal and the control signal previously in force applied to the aerodynamic surfaces.

Preferably, said computing means comprise a second comparator for comparing the present control signal to which a given value has been added and the control signal in force.

Advantageously, said computing means comprise a third comparator for comparing the present control signal with a predetermined reference value.

In particular, the output of the first AND logic gate and the outputs of the first, second and third comparators are connected to the respective inputs of a second AND logic gate whose output is connected to a memory, the latter being also connected to the output of the first switch.

Furthermore, the output of the first comparator controls a second switch to the two inputs of which are connected respective reference generators and whose output is connected to a device for limiting the rate of variation of the control signal, connected to the output of said memory.

BRIEF DESCRIPTION OF THE DRAWINGS

The figures of the accompanying drawings will better show how the invention may be put into practice.

DESCRIPTION OF THE PREFERRED EMBODIMENTS

Figure 1:
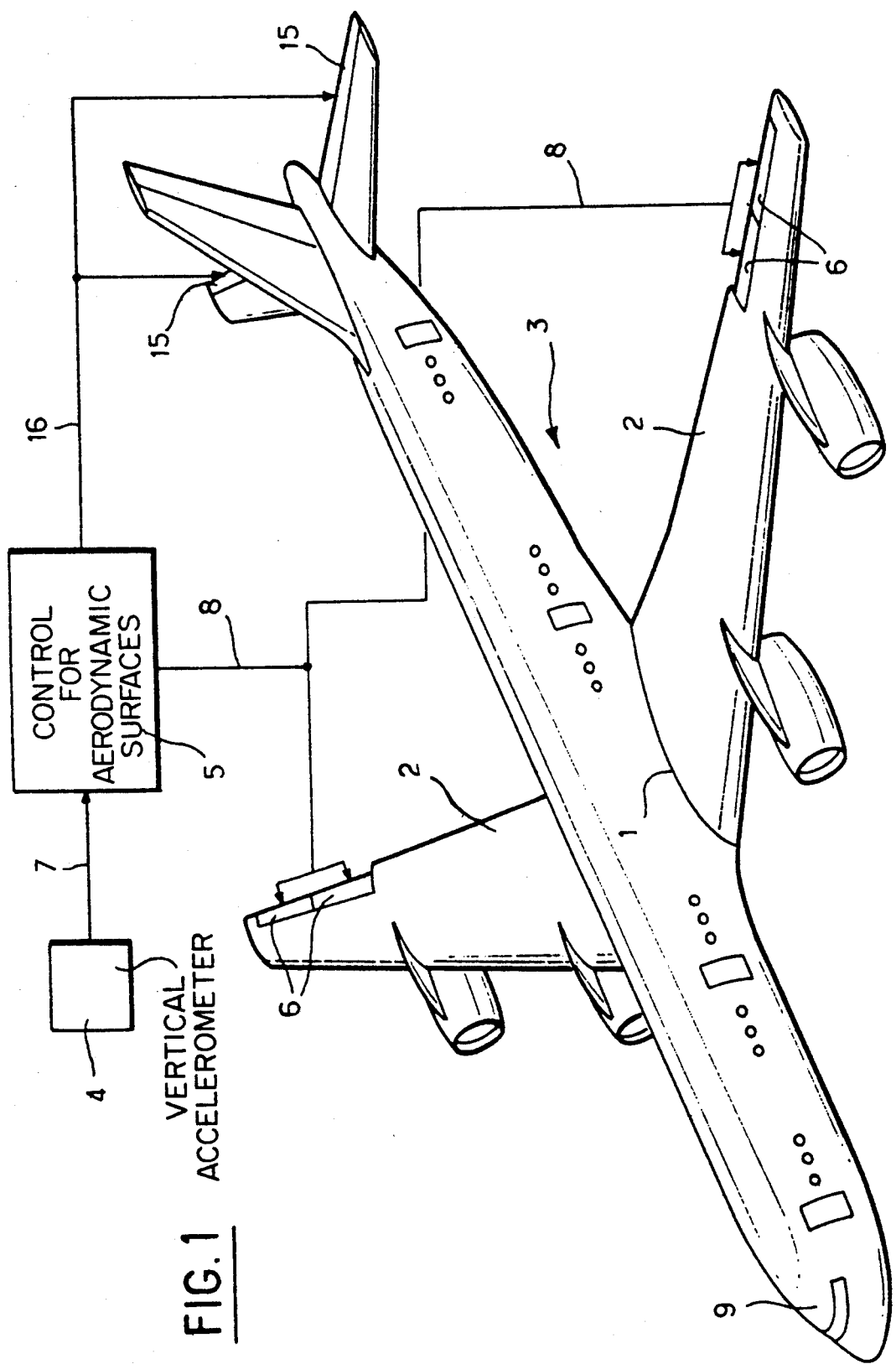
FIG. 1 illustrates schematically the system of the invention.

The system according to the present invention makes it possible to reduce the forces applied to the wings and particularly to the root 1 of the wings 2 of an aircraft in flight, particularly a heavy transport civil aircraft 3 as shown. Referring to FIG. 1, the system of the invention comprises means 4 for detecting and measuring the vertical acceleration of the aircraft, and means 5 for delivering signals for controlling the aerodynamic surfaces, such as ailerons 6, connected to the wings 2 of aircraft 3 in the vicinity of the free ends thereof, these control means 5 controlling the deflection angle of the aerodynamic surfaces 6 as a function of the acceleration signals which they receive from the detection and measurement means 4 by connection 7. For this, the control means 5 are connected by connections 8 to respective means (not shown) for actuating the ailerons 6. It will be noted that the detection and measurement means 4 comprise one or more accelerometers which, in actual fact, are advantageously implanted at the front of the aircraft, i.e. at the level of the piloting cabin 9.

Figure 3:
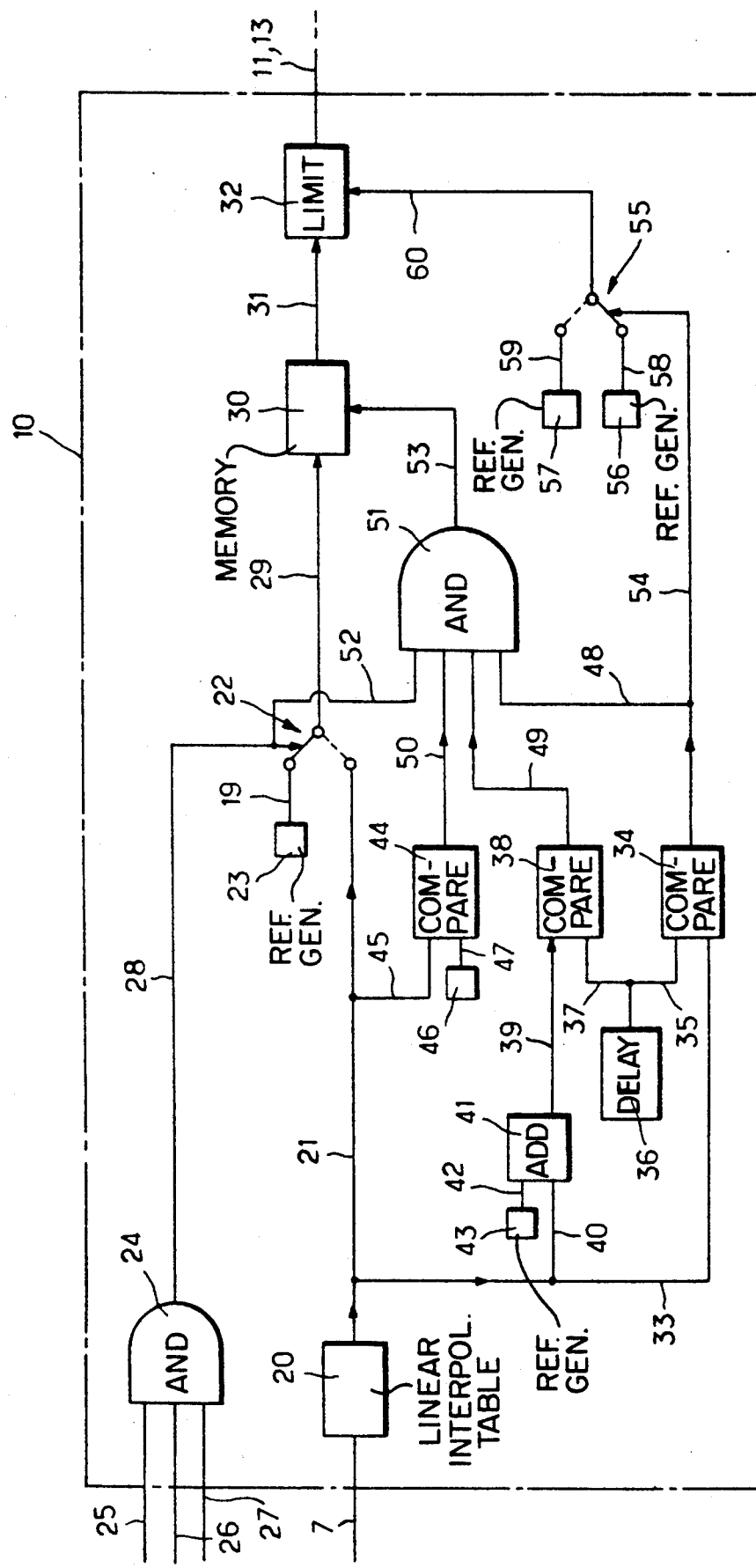
FIG. 3 is a logic diagram of one embodiment of the means for computing the control signal when the aircraft is effecting a maneuver.

More particularly, the control means 5 are only activated when the vertical acceleration $\gamma$ of the aircraft exceeds a predetermined threshold $\gamma s$, as will be seen in detail with reference to FIG. 3.

Figure 2:
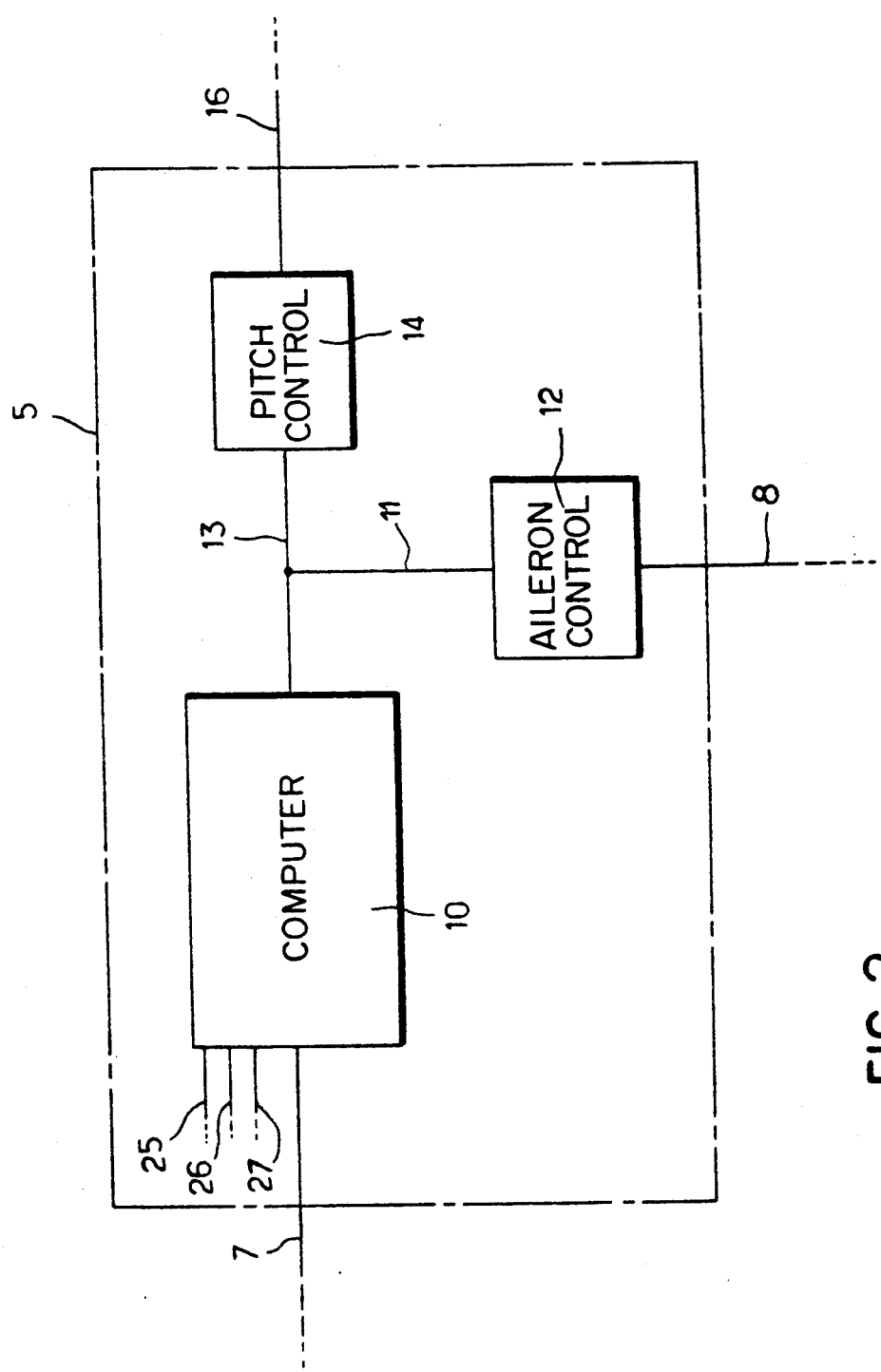
FIG. 2 is a block diagram of the control means of the system of FIG. 1.

Referring to FIG. 2, the control means 5 comprise means 10 for computing the control signal properly speaking connected, on the one hand, by connection 11 to means 12 for translating this signal into a deflection angle of the ailerons 6 and, on the other hand, by connection 13 to means 14 for translating this signal into a deflection angle of the pitch control surfaces 15, connected to the control means by connection 16, so as to counter the pitching moment created by deflection of ailerons 6.

The deflection angle of the ailerons 6 and of the pitch control surfaces 15 will be obtained by multiplying the control signal by a constant factor which depends on the nature of the aerodynamic surfaces (ailerons, pitch control surfaces or others) in question. In this connection, in addition to ailerons 6, the spoilers, not shown in FIG. 1, may also be adjusted for reinforcing the effect of lightening the forces on the root of the wings of the aircraft.

The principle of the invention, i.e. activation of the control means 5 of the aerodynamic surfaces 6 from a predetermined acceleration threshold is applicable not only when the aircraft is subjected to a gust of wind but also when it is effecting a maneuver such as a pull-up. By way of illustration, the means 10 for computing the control signal properly speaking will be described below with reference to FIG. 3, when the aircraft is effecting a maneuver.

The acceleration signal, conveyed by connection 7, is delivered to the input of a linear interpolation table 20. The latter is designed so that it delivers a control signal which remains 0 as long as the load factor (vertical acceleration) is less than or equal to the predetermined threshold, for example equal to 2 g, and which is interpolated linearly between 0 and 1 for any other value of the load factor between 2 and 2.5 g, the latter value corresponding to the maximum load factor permitted by piloting laws for heavy transport civil aircraft.

The control signal from the linear interpolation table 20 is fed by connection 21 to a first input of a switch 22 which switches from the position shown with a continuous line in the drawings, in which the output of switch 22 is connected to a zero value reference generator 23 which is connected to the second input of switch 22 by connection 19, to the position shown with a broken line, in which the control signal may be transmitted through said switch if the three following conditions are fulfilled:

1) The aircraft must be in flight; this information is delivered to a first input of a first AND logic gate 24 by connection 25; and 20 The aircraft must be in a smooth configuration (leading edge slats and wing flaps retracted); this information is delivered to a second input of the AND logic gate 24 by connection 26; and 3) The control stick or the lateral stick is deflected above a predetermined angular threshold for confirming the maneuver (for example 8° in the nose-up direction); this information is delivered to the third input of the AND logic gate 24 by connection 27. The output of the AND logic gate 24 is then at logic level 1 causing switch 22 to switch from the position shown with a continuous line to the position shown with a broken line.

The output of the AND logic gate 24 is connected to switch 22 which it controls by connection 28. In its turn, switch 22 is connected by connection 29 to memory 30 whose function will be explained further on, itself connected to a device 32 for limiting the rate of variation of the control signal, whose output is connected by connections 11 and 13 to means 12 and 14 for translating this control signal into a deflection angle of the ailerons 6 or of the pitch control surfaces 15 (FIGS. 1 and 2).

If the load factor γ increases, while still being greater than said threshold γs, the signals controlling the deflection angle of the aerodynamic surfaces 6 will be proportional to γ−γs (with γmax equal to 2.5 g). However, if the load factor decreases, while still remaining greater than threshold γs, the control signal effectively applied to the aerodynamic surfaces will only decrease after confirmation of this tendency, so as not to adversely affect the stability of the aircraft. For that, a hysteresis effect is created as will be described hereafter.

The control signal from the linear interpolation table 20 is fed by connection 33 to an input of a first comparator 34 whose other input receives by connection 35 the signal previously in force applied to ailerons 6, with a certain delay defined by device 36. Comparator 34 is such that, when the load factor decreases, i.e. when the signal in force is greater than the present control signal, its output is at logic level 1. By present control signal is meant the signal which has just been received by the computing means 10 and computed in the linear interpolation table 20.

The signal from device 36 is also applied to an input of a second comparator 38 by connection 37 whose other input receives, by connection 39, the signal from the linear interpolation table 20 by connection 40, to which a given value has been added, for example equal to 0.2, in the summator 41. For that, the second input of summator 41 is connected by connection 42 to a generator 43 generating this reference, for example 0.2. The output of comparator 38 is at logic level 1 if the signal delivered by connection 39 is greater than that delivered by connection 37, i.e. if the difference between the signal in force and the present signal is less than said given value, for example 0.2; which represents the wait for confirmation of the previously indicated tendency.

In addition, in a third comparator 44, the signal from the linear interpolation table 20 by connection 45 is compared with a given value, for example 0.1, delivered to the second input of comparator 44 by a reference generator 46 connected thereto by connection 47. The output of comparator 44 is at logic level 1 if said signal is greater than said reference value.

The output signals from comparators 34, 38 and 44 are fed, by the respective connections 48, 49 and 50, to three inputs of a second AND logic gate 51, whose fourth input is connected by connection 52 to the output of the first AND logic gate 24 and whose output is connected by connection 53 to the memory 30.

In the case where the output of the AND logic gate 51 is at logic level 1, i.e. the four inputs of said gate are at level 1, memory 30 is "frozen", which means that the previously defined value of the control signal ("control signal in force") is kept. More precisely, that occurs if and only if the following conditions are respected:

1) The load factor decreases (comparator 34),

2) This decrease is less than a certain threshold (comparator 38),

3) The signal is greater than a given value (comparator 44) and of course

4) The aircraft is in flight, in a smooth configuration and the control stick (or lateral stick) is deflected beyond a certain angular threshold (the output of AND logic gate 24 is at logic level 1).

On the other hand, if one of these four conditions (or group of conditions in so far as item 4 is concerned) is not respected, the output of the AND logic gate 51 then passes to logic level 0 and memory 30 becomes "transparent", i.e. it lets the present control signal transmitted by connection 29 pass. That occurs when:

the tendency is to an increase of the load factor, or with the load factor decreasing, the difference between the signal in force and the present control signal is greater than or equal to for example 0.2, or the control signal is, in absolute value, less than for example 0.1.

It will be noted that in the case where the output of the AND logic gate 24 is at logic level 0, the "transparent" memory lets the zero reference value (generator 23) pass as "control signal".

Moreover, the output of comparator 34 is also connected by connection 54 to a second switch 55 which may switch from the position shown with a continuous line in FIG. 3, when said output is at logic level 0, to the position shown with a broken line when the output of comparator 34 passes to the logic level 1. The first position corresponds to a rate of variation of the control signal, when the load factor increases, which is greater than that corresponding to the second position when the load factor decreases. In the first case, the rate of variation may be 0.5/s and, in the second case, 0.1/s. This information is transmitted respectively from the reference generators 56 and 57 connected to switch 55 by connections 58 and 59. Furthermore, switch 55 is connected to the device 32 for limiting the rate of variation of the control signal by connection 60.

That allows the rate of variation of the control signal to be adjusted in the direction of variation thereof: a low rate when this signal tends to decrease reduces the disturbances to the movement of the aircraft while keeping a sufficient level of lightening of the forces.

Thus, the system according to the present invention, on the one hand reduces the forces applied to the wings and particularly to the root of the wings of an aircraft when they risk reaching a critical value, i.e. when the vertical acceleration of the aircraft exceeds a predetermined threshold, but not taking into account "small" accelerations having no danger for the integrity of the structure of the wings and, on the other hand, creates a hysteresis effect by which, when the vertical acceleration decreases while remaining greater than said threshold, the deflection angle of the aerodynamic surfaces will develop in this direction only after confirmation of such tendency, so as not to adversely affect the stability of the aircraft. Of course, the principle of the present invention can be applied not only when the aircraft is effecting a maneuver, but also when it is subjected to a gust of wind.

What is claimed is:

1. A system for reducing the forces applied to the wings and particularly to the root of the wings of an aircraft in flight, comprising:

means for detecting and measuring the vertical acceleration of the aircraft, and providing corresponding acceleration signals, control means supplying signals for controlling the aerodynamic surfaces connected to the wings of the aircraft, said control means controlling the deflection angle of said aerodynamic surfaces as a function of said acceleration signals received by said control means, the latter being only activated when said vertical acceleration γ exceeds a first predetermined threshold γs, such that, when the vertical acceleration γ decreases while remaining above said threshold γs, a new control signal is effectively applied to the aerodynamic surfaces only when the difference between the signal in force previously applied to the aerodynamic surfaces and the new signal reaches a second predetermined threshold.

2. The system as claimed in claim 1, wherein, above said threshold $\gamma s$, said signals for controlling the deflection angle of said aerodynamic surfaces are proportional to $\gamma - \gamma s$.

3. The system as claimed in claim 1, adapted for reducing the forces applied to the wings and particularly to the root of the wings of the aircraft when the latter is effecting a maneuver such as a pull-up and when said aircraft is a heavy transport civil aircraft, wherein said acceleration threshold $\gamma s$ is substantially equal to 2 g.

4. The system as claimed in claim 3, for an aircraft having a maximum admissible acceleration $\gamma max$, wherein said control signal varies linearly between 0 and 1, when the acceleration $\gamma$ varies between said threshold $\gamma s$ and the maximum admissible acceleration $\gamma max$.

5. The system as claimed in claim 4, wherein the maximum admissible acceleration $\gamma max$ is substantially equal to 2.5 g.

6. The system as claimed in claim 1, wherein said control signals are used also for controlling the pitch control surfaces of the aircraft to counter the pitching moment created by deflection of said aerodynamic surfaces.

7. The system as claimed in claim 1, wherein the deflection angle of said aerodynamic surfaces and, if required, of the pitch control surfaces is obtained by multiplying the control signal by a constant factor which depends on the nature of said surfaces.

8. The system as claimed in claim 1, wherein a new signal is immediately applied to the aerodynamic surfaces when, above said threshold $\gamma s$, the vertical acceleration $\gamma$ increases.

9. The system as claimed in claim 1, wherein, with the control signal able to vary between 0 and 1, said second threshold is substantially equal to 0.2.

10. The system as claimed in claim 1, wherein a new control signal is immediately applied to the aerodynamic surfaces when said control signal is, in absolute value, less than a predetermined value.

11. The system as claimed in claim 10, wherein, with the control signal able to vary between 0 and 1, said value is substantially equal to 0.1.

12. The system as claimed in claim 1, wherein said control means comprise means for computing the control signal and means for translating this signal into a deflection angle of said aerodynamic surfaces.

13. The system as claimed in claim 12, wherein said means for computing the control signal comprise a linear interpolation table connected to said means for detecting and measuring the vertical acceleration of the aircraft.

14. The system as claimed in claim 13, wherein said computing means comprise a first AND logic gate, to the three inputs of which the following information is delivered:
 the aircraft is in flight or not,
 the aircraft is in a smooth configuration or not, and
 the control stick is deflected above a predetermined angular threshold or not,
and the output of which controls a first switch, whose two inputs are connected respectively to a zero value reference generator and to the output of said linear interpolation table.

15. The system as claimed in claim 14, wherein said computing means comprise a first comparator for comparing the present control signal and the control signal in force previously applied to the aerodynamic surfaces.

16. The system as claimed in claim 15, wherein said computing means comprise a second comparator for comparing the new control signal to which a given value has been added and the control signal in force.

17. The system as claimed in claim 16, wherein said computing means comprise a third comparator for comparing the present control signal with a predetermined reference value.

18. The system as claimed in claim 17, wherein the output of the first AND logic gate and the outputs of the first, second and third comparators are connected to the respective inputs of a second AND logic gate whose output is connected to a memory, the latter being also connected to the output of the first switch.

19. The system as claimed in claim 18, wherein the output of the first comparator controls a second switch to the two inputs of which are connected respective reference generators and whose output is connected to a device for limiting the rate of variation of the control signal, connected to the output of said memory.

* * * * *